United States Patent [19]

Thompson et al.

[11] 4,268,561
[45] May 19, 1981

[54] MEANS AND METHOD OF MANUFACTURING A HIGH STRENGTH BAR

[76] Inventors: James D. Thompson; Dennis E. Gates, both of 998 Weaver Rd., Bronson, Mich. 49028

[21] Appl. No.: 53,426

[22] Filed: Jun. 29, 1979

Related U.S. Application Data

[63] Continuation of Ser. No. 888,351, Mar. 20, 1978, abandoned.

[51] Int. Cl.³ ............................................. B32B 5/12
[52] U.S. Cl. .................................... 428/111; 156/204; 156/227; 156/242; 156/443; 156/500; 428/113; 428/121; 428/126; 428/130; 428/137; 428/193; 428/251; 428/252
[58] Field of Search ............... 428/111, 113, 121, 126, 428/130, 137, 193, 251, 252; 156/204, 227, 242, 443, 500; 264/93

[56] References Cited

U.S. PATENT DOCUMENTS 2,960,424  11/1960  Bjorholm ........................... 428/111

Primary Examiner—Marion McCamish
Attorney, Agent, or Firm—Bacon & Thomas

[57] ABSTRACT

A high strength bar and means and method of manufacture particularly suited for use as railroad crossties, planking, posts, beams, poles or the like, comprising woven fabric webs forming multiple laminations bonded by a high strength bonding agent, the fabric web laminations extending longitudinally of the bar and folded back and forth in the course of manufacture, then compressed and the bonding agent cured, the ratio of fabric to bonding agent ranging from 50% to 90%. Multiple laminations of fabric, with different weave patterns arranged to increase the strength of the bar may be applied simultaneously.

9 Claims, 11 Drawing Figures

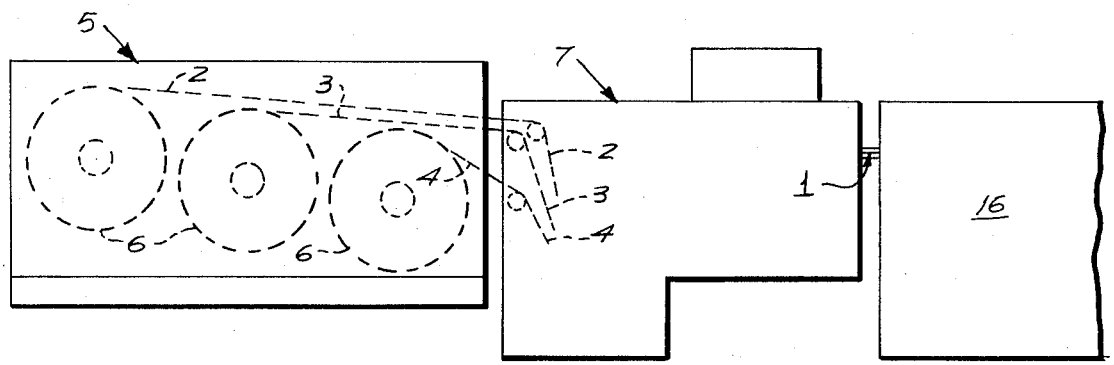
Fig. 1
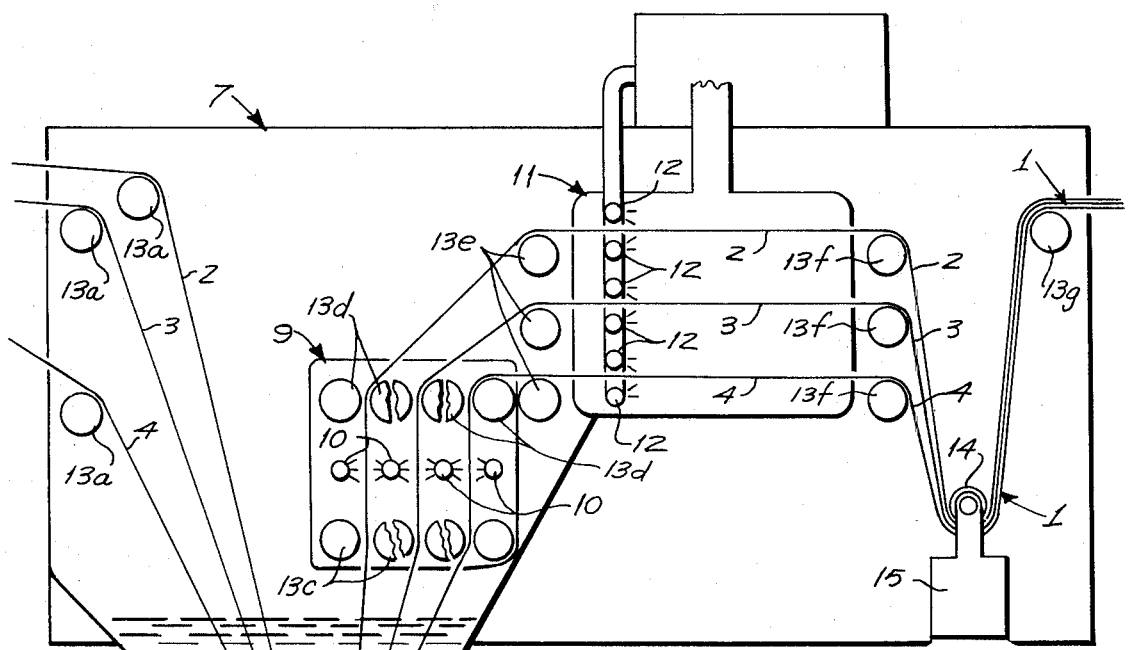
Fig. 2
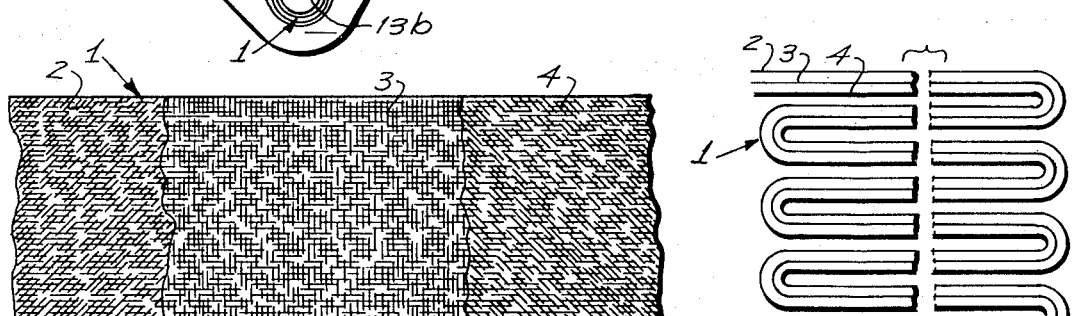
Fig. 4
Fig. 3

MEANS AND METHOD OF MANUFACTURING A HIGH STRENGTH BAR

This is a continuation of application Ser. No. 888,351, filed Mar. 20, 1978.

BACKGROUND

The present invention is directed to a bar construction and means and method of manufacture which is particularly, but not limited to, use as a railroad crosstie. Most of such crossties have heretofore been formed of wood. In more recent years, the use of steel reinforced concrete crossties and rubber insulated steel crossties have been used. Numerous problems exist, such as deterioration of wood crossties due to rotting, warping and splitting. Failure due to chemical reaction, rusting or electrolitic reaction as well as ultraviolet ray degradation occurs. Also the crossties do not have strength suitable for high speed rail systems.

SUMMARY

The present invention is summarized in the following objects:

First, to provide a bar, suitable for use as railroad crossties, planking, posts, beams, poles or the like, but not limited thereto, which comprises a series of woven fabric laminations impregnated with a bonding agent and pressed tightly together.

Second, to provide a bar suitable for use as a railroad crosstie, wherein the woven fabric laminations are capable of being drilled to form a spike receiving socket of smaller dimensions than the spike whereby, on driving the spike into the socket, the portions of the fibers contiguous to the socket fold in the direction of movement of the spike and apply a gripping force to retain the spike.

Third, to provide a multi-laminated bar formed of a multiplicity of woven fibers, a first set of laminations having longitudinal and transverse weaves disposed in a first pattern; a second set of laminations having longitudinal and transverse weaves disposed in a second pattern; the weaves of the second pattern being disposed between the weaves of the first pattern; and the laminations being compacted and bonded together.

Fourth, to provide a means and method of forming a bonded fabric bar wherein the laminations are impregnated with a bonding agent, then folded back and forth in a retainer channel of appropriate length whereupon the laminations are compressed then cured while compressed.

BRIEF DESCRIPTION OF THE FIGURES

FIG. 1 is a diagrammatical side view of the means for manufacturing a high strength bar.

FIG. 2 is an enlarged fragmentary diagrammatical sectional view of the bonding resin treatment unit.

FIG. 3 is a diagrammatical view of the multiple lamination folded web which forms the high strength bar.

FIG. 4 is a fragmentary diagrammatical plan view of the multi-laminated web with a portion of each lamination exposed.

DETAILED DESCRIPTION

Figure 5:
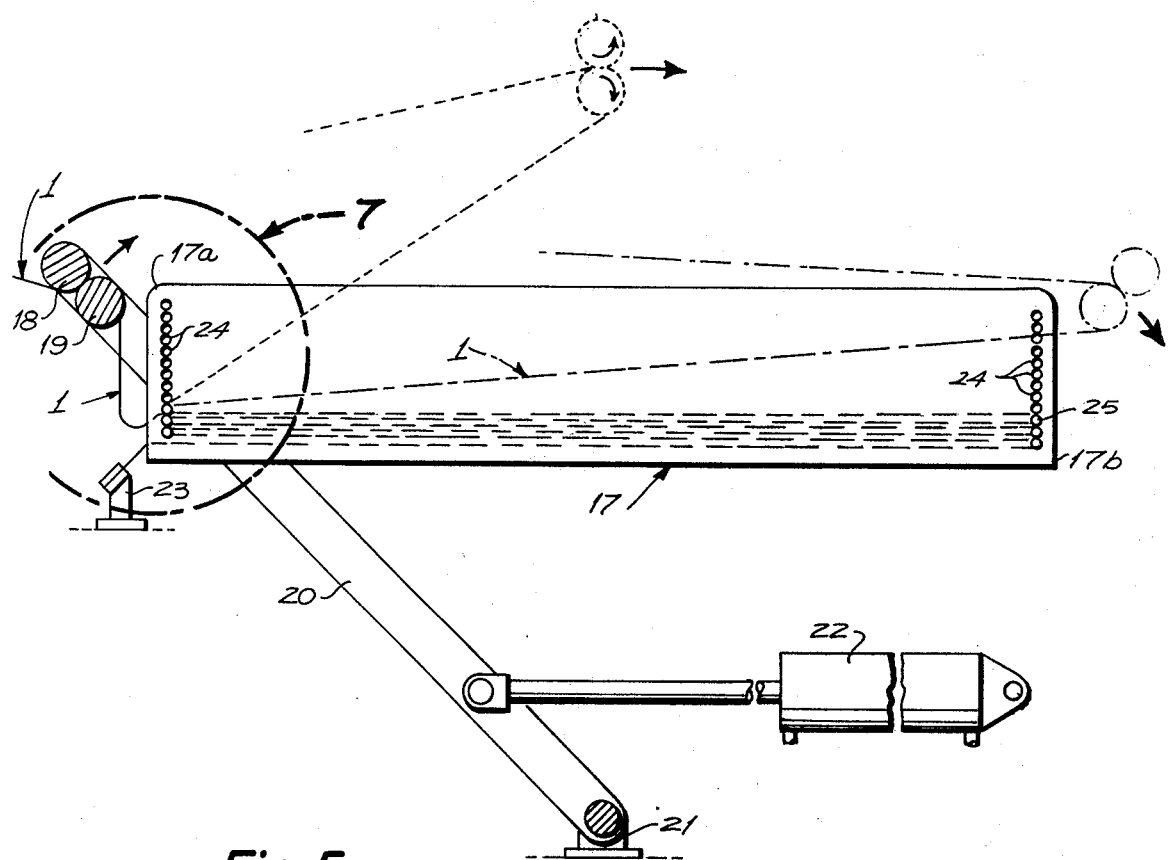
FIG. 5 is a diagrammatical view of the high strength bar forming unit including a forming structure having lapping rollers disposed at the receiving end of the unit, and indicating the lapping rollers by broken lines as they progress from the receiving end to the extended end of the forming unit.

The high strength bar indicated by B is formed of a multiple laminated woven fiber web 1 which is indicated diagrammatically in FIGS. 1, 2 and 3 as having three laminations 2, 3 and 4. Each lamination is woven from strands of jute, hemp, sisal, ramie, mace, cotton or fiberglass or combinations thereof. The strands are relatively rought and have random projecting fibers. As shown in FIG. 4, all three laminations 2, 3 and 4 have warps parallel to their sides; whereas the woof of the central lamination 2 is at 90° to the warp, the underlying lamination 3 has a warp 45° thereto in one direction and the overlying lamination 4 has a warp 45° in the opposite direction. This arrangement greatly increases the strength of the laminated product.

Additionally, the individual webs 2, 3 and 4 are contained within a reel unit 5 having a reel 6 for each lamination. The laminations are fed in unison from the reel unit into a resin treatment unit 7 having a resin reservoir 8 into which the laminations are dipped. The separated laminations are passed through a resin applicator 9 having high pressure nozzles 10 and continue therefrom through a catalyst injector chamber 11 having nozzles 12.

The webs are maintained in position by a series of rollers which include an initial set 13a at the entrance end of the treatment unit 7. All of the webs 2 may pass about a single roller 13b submerged in the resin reservoir 8 or each web may pass about a separate roller. The webs 2, in passing through the reservoir, become saturated with the resin.

On entering the resin applicator 9, each web 2 passes between a pair of rollers 13c. The resin as discharged from the nozzles 10 is in a highly vaporized state and completes saturation of the fibers comprising the webs. While the reservoir is preferred, it may be omitted and the resin applicator 9 lengthened and provided with additional nozzles 10. Conversely, the resin applicator 9 may be omitted, except for the discharge rollers 13d.

The webs 2, on leaving the resin applicator 9, pass between pairs of rollers 13d which squeeze out excess resin as well as entrapped air. The webs then pass over rollers 13e at the entrance end of the catalyst injector chamber 11. The catalyst is in a highly volatile state and is readily absorbed into the resin.

On leaving the catalyst injector chamber 11, the webs pass over rollers 13f, then under a roller 14 which supports a weight 15, and finally pass over an exit roller 13g.

The weight serves to maintain the laminations 2, 3 and 4 under tension and in mutual contact, forming the multi-laminated web 1.

The multi-laminated web 1 passes from the resin treatment unit 7 into a high strength bar forming unit 16. Included in the forming unit 16 is a web receiving channel member 17 with heavy walls capable of withstanding a high compaction force applied to a substantial number of multi-laminated webs.

A pair of lapping rollers 18 and 19 of greater width than the web 1 are mounted on an angularly oscillatable frame 20 pivoted about a mounting bracket 21 below the chamber member 17 and driven by a drive means 22.

The frame 20 includes members contiguous to opposite sides of the channel member 17 and extend above the channel member to receive the lapping rollers 18 and 19 so that they may oscillate back and forth above the channel member 17 and beyond the extremities 17a and 17b thereof. The initial end of the web 1 is passed between the rollers and is then secured by a clamp 23 disposed at the receiving end 17a of the channel member 17. Initially the web 1 passes between the lapping rollers 18 and 19 and extends directly to the clamp 23.

Figure 6:
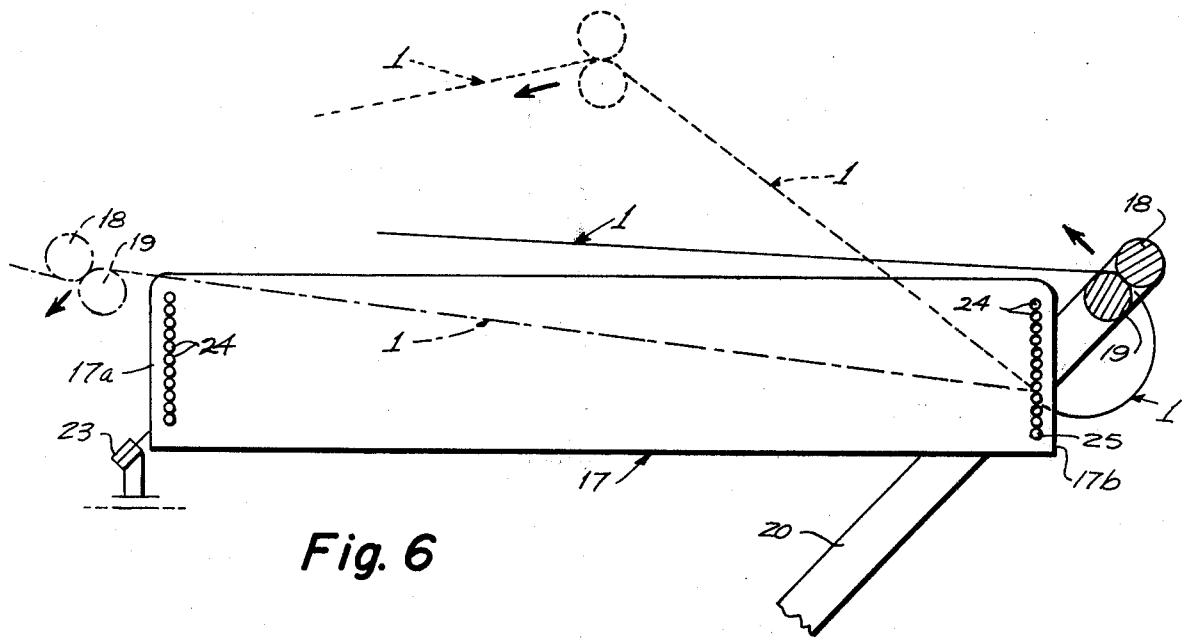
FIG. 6 is a similar diagrammatical view showing the lapping rollers in solid lines at the extended end of the forming unit and by broken lines as the rollers return to the receiving end of the forming unit.
Figure 7:
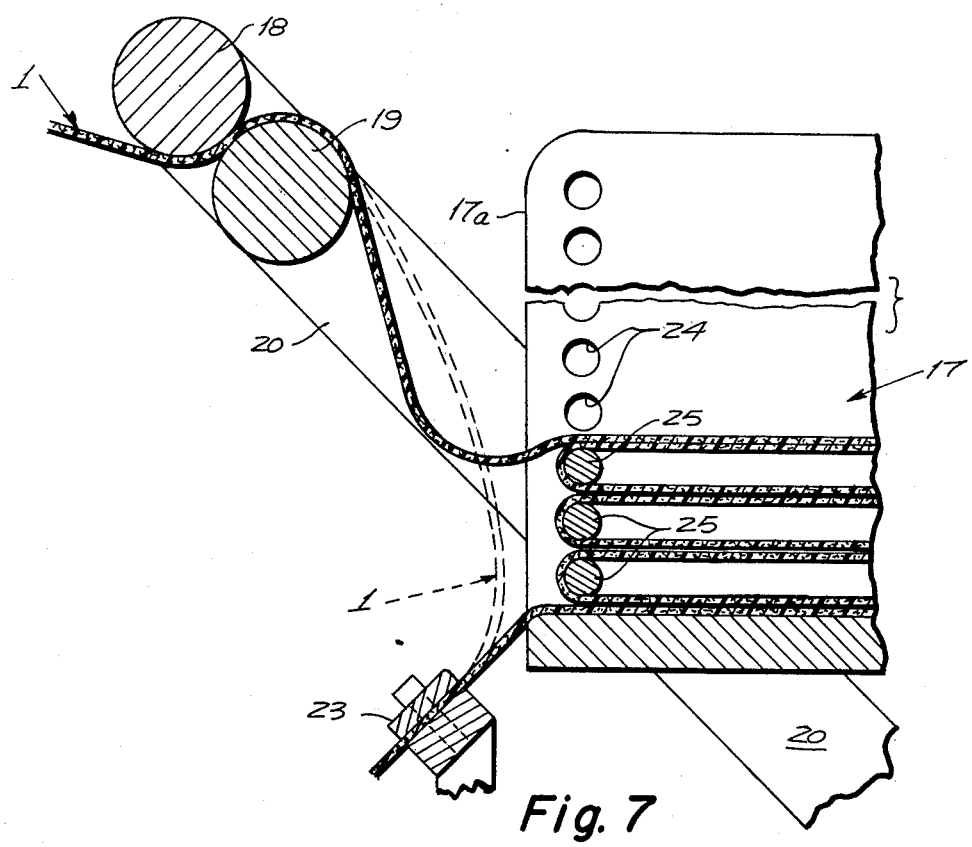
FIG. 7 is an enlarged fragmentary sectional view taken within circle 6 of FIG. 5.

The lapping operation performed by the rollers is as follows:

Initial movement of the rollers 18 and 19 is from the receiving end 17a toward and beyond the extended end 17b of the channel member 17 as viewed in FIG. 5. The rollers continue from the position indicated a short distance so as to bring the initial lap of the web 1 essentially into contact with the bottom of the channel member 17. Movement of the roller arm 20 is then reversed. The extremities of the channel member 17 are provided with transversely aligned openings 24, as shown in FIG. 7, which receive cross pins or fold maintaining pins 25. When the web 1 at the extended end 17b of the channel member 17 is in its lower position underlying the initial pair of openings 24, a fold maintaining pin 25 is inserted. Continuing movement from the right side of the channel member as viewed in FIG. 6, the web 1 folds over the pin 25.

During return movement, appropriate tension is maintained on the web 1 due to the weight 15. When the rollers return to the receiving or left hand side of the channel member 17, they move downward in the direction of the arrow indicated until a pin 25 may be inserted in overlying relation with the web 1.

Figure 8:
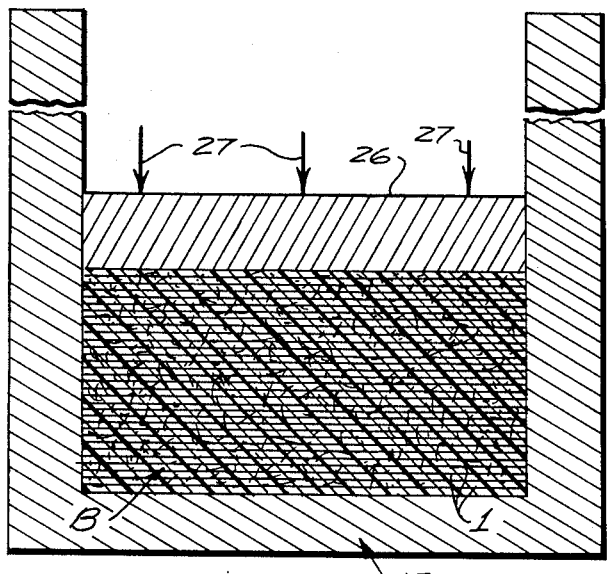
FIG. 8 is a further enlarged transverse sectional view showing the woven web folded within a channel member and subjected to a compaction bar.

Additional layers are positioned as the rollers are moved back and forth and pins are inserted to maintain the folded condition of the web. When the desired number of the layers have been placed, the web is cut, the channel member 17 is removed and a compaction bar 26 is placed over the folded stack of web layers and subject to a compressive load as represented by the arrows 27 in FIG. 8. Before compaction of the set of web laminations forming the bar B, the cross pins 25 are removed.

Alternatively, the cross pins 25 may be placed beyond the ends 17a and 17b of the channel member 17 and held in place by the folded laminations against the ends 17a and 17b.

Figure 9:
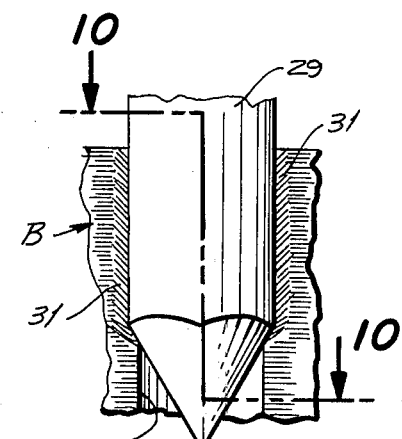
FIG. 9 is a still further enlarged fragmentary sectional view of the completed high strength bar showing an opening formed therein and showing a spike of circular cross section driven therein.
Figures 10, 11:
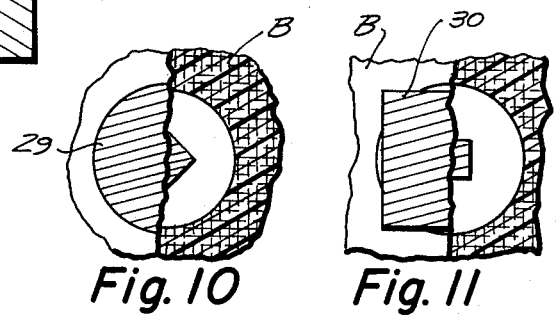
FIG. 10 is a fragmentary transverse sectional view taken through 10—10 of FIG. 9.
FIG. 11 is a view similar to FIG. 10 showing in section a spike of square cross section.

Referring to FIGS. 9, 10 and 11, the finished bar B may be machined, cut, drilled or otherwise modified. For example, if the bar is employed as a crosstie, spike bores 28 may be drilled into the bar. Such bores are smaller in diameter than a round spike 29 or smaller than the diametrical distance between the corners of a square spike 30. As a consequence, the spike, as it is driven into the bore, causes the extremities of the fibers to deflect axially inward as indicated by 31. Tests have demonstrated that the force required to drive the spike into the bore is less than the force required to remove the spike.

The amount of bonding resin and the manner of application is such as to saturate the fibers so as to maintain entrapment of air or other gases, yet avoid excess resin. The compaction applied is in the range of 45,000 to 50,000 pounds per square inch (18,650 kg per 1 cc.). Such compaction produces a bar in which the volume percentage of fiber may be in the range of 80% and 90%. An optimum percentage is in the order of 90%.

Such compaction is maintained while the bar B is fully cured. After cure, the bar is removed and the ends of the bar are trimmed.

While a wide range of bonding resin may be used, the following has been tested and is presented as an example, not as a limitation:

POLYESTER RESIN
    Laminating
    Type—Rigid
    Dibasic Acid—Based on Phthalic Anhydride
    Solution Characteristics
        Viscosity CPS at 77° F.=250
        Lbs/Gal—9.10
        Specific Gravity at 77° F.=1.090
        Styrene Content—44%
    Curing Characteristics
        Gel Time—70° F.—18 min.
        Peak Exotherm °F.—350
        Cure Rate—Medium to Fast
    Properties of Clear Casting
        Color—Amber
        Heat Distortion (°F. at 264 psi)—200
        Barcol Hardness—42
        Izod Impact (Un-notched) (Ft Lb/in)—2.8
        Flexural Strength ($10^2 \times$ psi)—16.2
        Volume Shrinkage—7.2%

A bar formed of 9" (229 mm) webs of jute fiber impregnated with a polyester resin was folded in the manner herein illustrated and compressed to form a bar having the dimensions of a railroad crosstie; namely, 9"×7"×85" (299 mm×178 mm×2.134 mm) was subjected to tests conducted by the Association of American Railroads corresponding to the standard tests of wooden crossties, and in each test the bar identified above was superior.

Having fully described my invention, it is to be understood that I am not to be limited to the details herein set forth, but that my invention is of the full scope of the appended claims.

I claim:

1. A high strength bonded fiber member, comprising:
   a set of woven laminations formed of high strength fibers, each lamination having longitudinally extending warp strands parallel to opposite sides thereof;
   the laminations having woof strands at respectively different angles to their sides;
   said set of laminations being continuous and repeatedly folded upon itself at opposite extremities of the fiber member;
   the laminations being fully permeated with a bonding agent.

2. A high strength bonded fiber member as defined in claim 1, wherein:
   a. the member is provided with spike receiving bores exposing the extremities of a multiplicity of fibers thereto, whereby on forcing a spike of larger diameter into the bore, the portions of the fibers contiguous to their exposed ends are deflected in the direction of movement of the spike, and resist outward movement of the spike from the bore.

3. A method of forming a high strength bonded fiber bar, utilizing a continuous web of woven fiber, the method characterized by:

forming a web comprising a set of woven laminations of high strength fibers having warp strands extending parallel to their opposite sides and the laminations of the set having woof threads at respectively different angles to their sides;

permeating the woven fiber with a bonding agent, folding preselected successive lengths of web upon itself to form a multiplicity of laminations;

compacting the laminations;

and curing the bonding agent while the laminations are maintained in a compacted condition.

4. A method as defined in claim 3, wherein:
a. the laminations are compacted until the volume of the fibers exceeds 50% of the total volume of the bar.

5. A method of forming a high strength bonded fiber member, characterized by:
a. simultaneously saturating a plurality of continuous webs of woven fibers with a bonding agent in an uncured condition;
b. individually pressing the webs to remove excess bonding agent;
c. simultaneously passing the webs through a catalyst chamber while in a separated state and subjecting the bonding agent of each web to a vaporized catalytic agent;
d. stacking the webs upon each other to form a set and folding said set upon itself;
e. subjecting said folded set to transverse compression;
f. and curing the bonding agent while the folded set is maintained under compression.

6. A means for forming a high strength bonded fiber bar, comprising:

a. means for permeating a continuous web of a set of laminations of woven high strength fibers with a bonding agent capable of being cured;
b. means for folding successive lengths of said set up itself in successively opposite directions;
c. means for stacking the set as folded to form a multiplicity of sets of laminations;
d. and means for compressing the folded and stacked sets of laminations and maintaining the laminations under compression during curing of the bonding agent.

7. A bar forming means, as defined in claim 6, wherein:
a. said compression means compresses the woven web laminations until the web laminations occupy from 50% to 90% of the volume of the bar.

8. A bar forming means, as defined in claim 6, wherein:
a. the stacking means is a channel shaped receiver dimensioned to receive the web laminations as folded;
b. the folding means includes a pair of web receiving rollers, means for moving the rollers back and forth over the receiver, and means insertable across the ends of the receiver to cause said means to fold over the web as movement of the rollers is reversed.

9. Means for forming a high strength bonded fiber member, comprising:
a. means for dipping at least one continuous web of woven high strength fibers into a reservoir r containing a bonding agent capable of being cured;
b. means for pressing excess bonding agent from the web;
c. means for passing said web through a catalyst chamber containing a catalyst maintained in a vaporized state for receiving the resin treated web to initiate a catalytic reaction with the resin;
d. means for folding and stacking a plurality of folds of said web;
e. means for compressing the folded and stacked web;
f. and means for curing the folded and stacked web while being maintained under compression.

* * * * *